United States Patent
Gately

[15] 3,670,246
[45] June 13, 1972

[54] UNDER-VOLTAGE MONITORING DEVICE HAVING TIME DELAY MEANS FOR REGULATED POWER SUPPLIES

[72] Inventor: Joseph R. Gately, Woodside, N.Y.
[73] Assignee: Forbro Design Corp., New York, N.Y.
[22] Filed: March 16, 1970
[21] Appl. No.: 19,858

[52] U.S. Cl..........................324/133, 324/29.5, 340/248 B
[51] Int. Cl.........................................................G01r 19/16
[58] Field of Search.................324/133, 29.5; 340/248, 249; 317/148.55, 141 S; 307/235

[56] References Cited

UNITED STATES PATENTS

| | | |
|---|---|---|
| 3,532,968 | 10/1970 | Overlie................................340/249 X |
| 3,315,246 | 4/1967 | Huffman et al. ..................324/133 UX |
| 3,493,790 | 2/1970 | Lundin..........................317/141 S UX |
| 3,166,678 | 1/1965 | Fleshman et al. ............340/248 A UX |
| 3,457,560 | 7/1969 | McKinley............................340/248 C |
| 3,383,522 | 5/1968 | Apfelbeck et al......................307/235 |
| 3,482,231 | 12/1969 | Florek et al.....................340/248 A X |
| 3,482,234 | 12/1969 | Doniger et al. .....................340/248 A |

Primary Examiner—Gerard R. Strecker
Attorney—Alfred W. Barber

[57] ABSTRACT

A regulated power supply for use with voltage sensitive devices such as integrated circuits is monitored for low voltage conditions. When the monitored voltage drops below or remains below a predetermined level for longer than a predetermined period of time an inhibit signal is provided.

7 Claims, 3 Drawing Figures

INVENTOR.
JOSEPH R. GATELY
BY
*Alfred W. Barber*
ATTORNEY

INVENTOR.
JOSEPH R. GATELY
BY
*Alfred W. Barber*
ATTORNEY

UNDER-VOLTAGE MONITORING DEVICE HAVING TIME DELAY MEANS FOR REGULATED POWER SUPPLIES

It is characteristic of certain logic circuits that operation must be suppressed when and if the supply voltage falls below or has not yet reached some critical value. To insure that a safe voltage has been attained and is being maintained, it is desirable to provide means for inhibiting or signalling an unsafe supply voltage condition for a short period after safe operating voltage has been attained.

Accordingly, it is one object of the present invention to provide an inhibit signal at all times when the supply voltage is below a predetermined (safe) voltage.

It is a further object to provide the inhibit signal for a short but predetermined length of time after the supply voltage has attained a safe operating value.

SUMMARY

A Schmitt trigger compares the load voltage across circuits to be protected from low voltage conditions changes its condition at a predetermined undervoltage point, say 4.7 volts for a circuit normally operated at 5 volts. A time delay circuit is provided including a capacity normally charged and in charged condition providing no output warning (clear) signal to the circuit protective means, when the load voltage drops below the predetermined undervoltage point, the Schmitt trigger switches. Coupled to the trigger circuit is a transistor which is connected across the capacitor. When this transistor is turned on by the trigger action, it discharges the capacitor which in turn turns on a transistor in the output circuit providing a warning (clear) signal. If the load voltage again returns to normal, a current regulated circuit charges the capacitor again at a predetermined rate so that it reaches a terminal voltage sufficient to turn off the warning (clear) circuit after a predetermined time interval. The charging current is made adjustable so that the time required to turn off the warning circuit is adjustable around, say, 3 seconds. The monitoring circuit is designed to come to a stable operating condition in a very short time so that if it is turned on at the same instant that the power supply being monitored is turned on it will hold the warning signal circuit on until a predetermined time after the load voltage has reached its normal operating point.

In the drawing

Figure 1:
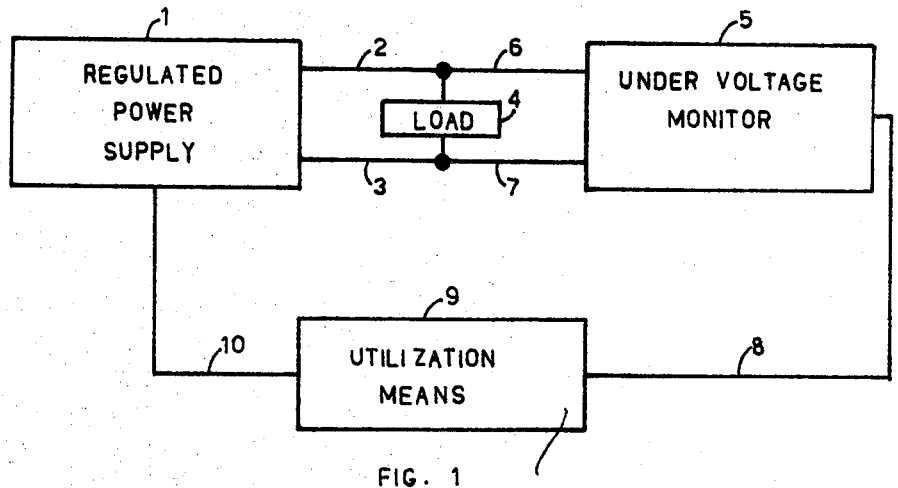
FIG. 1 is a block diagram of a system incorporating the invention.

FIG. 1 shows a regulated power supply 1 supplying power to a load 4 over leads 2 and 3. The undervoltage monitor 5 is connected across the load 4 by means of leads 6 and 7. A warning or clear signal is provided over lead 8 whenever the load voltage is below a predetermined level. This signal is used by suitable utilization means 9 as by feeding back a cut-off signal to power supply 1 over lead 10. The internal circuitry of the preferred form of undervoltage monitor 5 is shown in detail in FIG. 3 and is described below.

Figure 2:
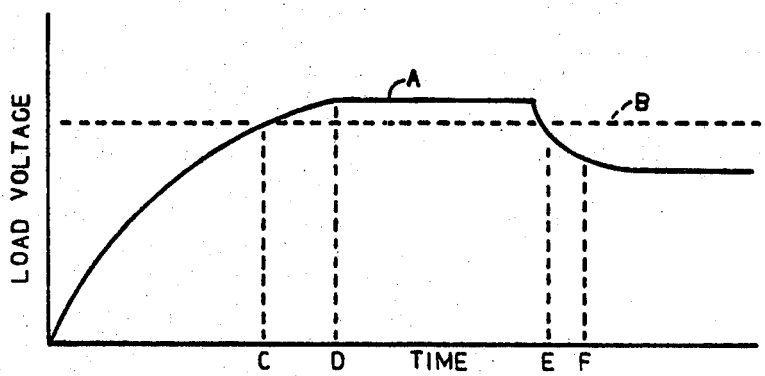
FIG. 2 is a graphical representation of the operation of the invention.

FIG. 2 illustrates the operation of undervoltage monitor 5 during turn-on of the regulated power supply 1 and in the presence of a decrease in load voltage below a predetermined level which is less than the normal load operating voltage. Curve A simulates the rise of the load voltage from the instant of turn on of the power supply at time zero until it reaches normal operating voltage. At low voltage and until the load voltage reaches the preset level B, the undervoltage monitor 5 remains set providing an output clear signal over lead 8. When level B is exceeded starting at time C, the undervoltage monitor 5 starts to reset and when the load voltage has remained above the level B for a preset time, C to D, the output clear signal is turned off and no signal is provided over line 8. If the load voltage, for any reason, drops below preset level B as at time E, the undervoltage monitor quickly, as at time F, takes hold and supplies a warning clear signal over line 8. The warning signal will not be removed again until the load voltage again exceeds level B and remains above level B for the predetermined preset interval of time.

Figure 3:
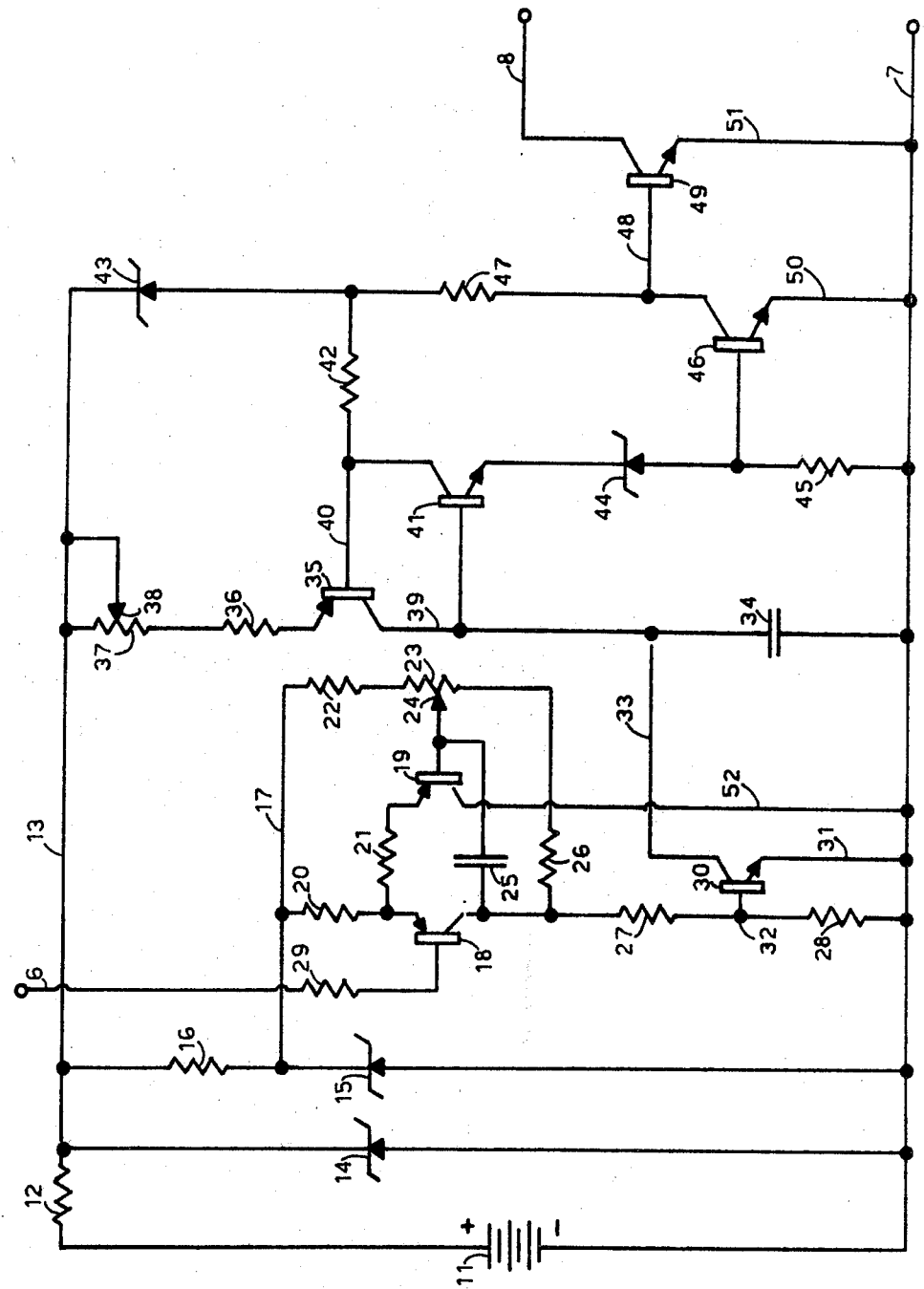
FIG. 3 is a detailed schematic circuit diagram of the preferred form of the present invention.

FIG. 3 is the circuit of the preferred form of the invention. The undervoltage monitor is powered from a suitable source of voltage illustrated by battery 11 and regulated to provide two regulated voltages, one on line 13 and the other on line 17. The first regulated voltage is provided across zener diode 14 receiving current from voltage source 11 through dropping resistor 12. The second regulated voltage is provided across zener diode 15 supplied with current through dropping resistor 16 from the first regulated voltage across zener diode 14. Thus, the second regulated voltage is highly stable as a result of the two stages of regulation. This second and highly regulated voltage is applied to a Schmitt trigger circuit comprising transistors 18 and 19 and the associated circuitry. This circuitry includes emitter resistor 20 connected between line 17 and the emitter of transistor 18; resistor 21 connected between the emitters of transistors 18 and 19; resistors 27 and 28 joined at junction 32 and connected from the collector of transistor 18 to common line 7; resistor 22, potentiometer 23 and resistor 26 all connected in series between line 17 and the collector of transistor 18. The base of transistor 19 is connected to the adjustable contact 24 of potentiometer 23. The base of transistor 18 is connected through resistor 29 to line 6 which is to be connected to the positive side of the load to be monitored (common line 7 is to be connected to the other side of the load). Capacitor 25 is connected to the base of transistor 19 and the collector of transistor 18 to accelerate the switching operation of the trigger.

It will be seen that with a low voltage from the load applied to the base of transistor 18, this transistor will be on and transistor 19 will be off. As the load voltage rises, a point will be reached at which the voltage on the base of transistor 18 will be sufficiently positive to turn transistor 18 off causing the circuit to trigger with transistor 19 turning on. The triggering point is determined by the circuit constants and the setting of the adjustable contact 24 (base of transistor 19). In the example given above, the trigger voltage is 4.7 volts. The Schmitt trigger is designed to have very little hysteresis so that for practical purposes we can say it switches at 4.7 volts when the voltage on the base of transistor 18 reaches 4.7 volts from either direction. Thus, transistor 18 is on (conducts) whenever the load voltage is below the predetermined and preset value as stated, 4.7 volts.

As long as transistor 18 is conducting, current flows from its collector through resistors 27 and 28 and the base of transistor 30 connected to junction point 32 receives a positive bias causing it to be on or conducting. Since the collector to emitter path of transistor 30 is connected over leads 33 and 31 respectively across capacitor 34, capacitor 34 is shorted and supports no voltage as long as transistor 18 is conducting due to low voltage across the load. With no voltage across capacitor 34 the base of transistor 41, connected to one side thereof, is held down to a low voltage and transistor 41 is held off. With transistor 41 off, no current flows from its emitter through zener diode 44 or resistor 45 and the base of transistor 46 connected to the junction between zener diode 44 and resistor 45 receives no bias. With no bias on its base, transistor 46 is off or non-conducting. The collector of transistor 46 is connected to line 13 through resistor 47 and zener diode 43 in series and the emitter of transistor 46 is connected to common lead 7 by lead 50. With transistor 46 off, the base of transistor 49, connected to the collector of transistor 46 by lead 48, receives a positive bias from line 13 through zener diode 43 and resistor 47 and transistor 49 is turned on and is conducting. With transistor 49 conducting a circuit closure is provided between line 8 connected to its collector and common line 7 connected to its emitter by lead 51. This circuit closure provides the warning or clear signal indicating that the load voltage is below the predetermined voltage chosen as the monitored value (4.7 volts).

When the load voltage rises above the preset monitored value (4.7 volts), the Schmitt trigger switches conduction from transistor 18 to transistor 19, the emitter of which is returned to common line 7 by lead 52, and the bias is removed from the base of transistor 30 (since transistor 18 becomes non-conducting and practically no current flows from is emitter through resistors 27 and 28). With transistor 30 non-conducting, the collector to emitter shunt path is opened across capacitor 34. A controlled current charging circuit is provided to charge capacitor 34 when this shunt path is open. Transistor 35 is connected as a constant current source. The voltage across zener diode 43 (for example 3.3 volts) is applied to the base of transistor 35 and fixed resistor 36 in series with adjustable resistor 37 are connected in series with the emitter of transistor 35. The current from the collector of transistor 35 over lead 39 to charge capacitor 34 will be substantially equal to the zener voltage (3.3 volts) of zener diode 43 divided by the sum of resistors 36 and 37 (neglecting the base to emitter drop of transistor 35). The magnitude of this current can be adjusted by changing the setting of variable contact 38 of adjustable resistor 37. When the voltage across capacitor 34 reaches the zener voltage of zener diode 44 plus the base to emitter conduction voltages of transistors 41 and 46, transistors 41 and 46 will be turned on. When transistor 46 goes on, the resulting saturation voltage (collector to emitter voltage) of transistor 46 will turn transistor 49 off and the warning or clear signal conduction condition on line 8 will be removed indicating that the load voltage being monitored has exceeded the preset voltage (4.7 volts) and has remained in excess for a predetermined period of time (the time required to charge capacitor 34). The time for which the monitored voltage must exceed the preset voltage may be adjusted by selecting the charging rate of capacitor 34, by changing the setting of adjustable contact 38 of resistor 37.

If the monitored voltage drops below the preset voltage, the system resets to its initial condition, i.e., transistor 18 turns on, turning on transistor 30 which heavily shunts capacitor 34, quickly dropping its voltage and in turn, turning transistors 41 and 46 off and transistor 49 on, restoring the warning or clear shunt condition between line 8 and common line 7. Thus, the system quickly signals an undervoltage condition at the load but does not signal normal operation until the normal operation has persisted for a predetermined period of time. transistor 35 over lead 39 to charge capacitor 34 will be substantially equal to the zener voltage (3.3 volts) of zener diode 43 divided by the sum of resistors 36 and 37 (neglecting the base to emitter drop of transistor 35). The magnitude of this current can be adjusted by changing the setting of variable contact 38 of adjustable resistor 37. When the voltage across capacitor 34 reaches the zener voltage of zener diode 44 plus the base to emitter conduction voltages of transistors 41 and 46, transistors 41 and 46 will be turned on. When transistor 46 goes on, the resulting saturation voltage (collector to emitter voltage) of transistor 46 will turn transistor 49 off and the warning or clear signal conduction condition on line 8 will be removed indicating that the load voltage being monitored has exceeded the preset voltage (4.7 volts) and has remained in excess for a predetermined period of time (the time required to charge capacitor 34). The time for which the monitored voltage must exceed the preset voltage may be adjusted by adjusting the charging rate of capacitor 34, by changing the adjustment of resistor 38.

If the monitored voltage drops below the preset voltage, the system resets to its initial condition, i.e. transistor 18 turns on, turning on transistor 30 which heavily shunts capacitor 34, quickly dropping its voltage and in turn, turning transistors 41 and 46 off and transistor 49 on, restoring the warning or clear shunt condition between line 8 and common line 7. Thus, the system quickly signals an undervoltage condition at the load but does not signal normal operation until the normal operation has persisted for a predetermined period of time.

I claim:

1. In a voltage monitoring system, the combination of:
    a source of adjustable reference voltage;
    means for comparing a voltage to be monitored with said reference voltage;
    switching means responsive to monitored voltage less than said reference voltage coupled to said comparing means;
    adjustable time delay means;
    means coupling said adjustable time delay means to said switching means;
    means included in said coupling means responsive to said switching means for disabling said time delay means in response to monitored voltage less than said reference voltage;
    and output signaling means coupled to said time delay means and responsive thereto to indicate an undervoltage condition of the monitored voltage.

2. A voltage monitoring system as set forth in claim 1;
    wherein said switching means comprises a Schmitt trigger circuit.

3. A voltage monitoring system as set forth in claim 1;
    wherein said time delay means includes an adjustable constant current source and a capacitor connected to be charged by said constant current.

4. A voltage monitoring system as set forth in claim 1;
    wherein said output signaling means includes a transistor indicating undervoltage condition of the monitored voltage by a turned-on state.

5. A voltage monitoring system as set forth in claim 1;
    wherein said switching means comprises a Schmitt trigger and including means for applying the voltage to be monitored to the input thereof.

6. In a voltage monitoring system, the combination of; trigger means for comparing a voltage to be monitored with a reference voltage; adjustable time delay means;
    means coupling said adjustable time delay means to said trigger means;
    indicating means coupled to said time delay means;
    said trigger means, time delay means and indicating means being adapted to respond to increasing monitored voltage rising above a predetermined level to actuate said indicating means after a predetermined time delay;
    and wherein said time delay coupling means includes inhibiting means for disabling said time delay means adapted to respond to decreasing monitored voltage falling below said predetermined level to actuate said indicating means in substantially less than said delay time.

7. In a voltage monitoring system, the combination of;
    A Schmitt trigger including two bipolar transistors, adjustable means for setting the triggering point and means for applying the voltage to be monitored to the input thereof;
    a capacitor coupled to an output, normally on, bipolar transistor, said coupling adapted to turn said bipolar transistor off in response to a predetermined charge voltage across said capacitor;
    a transistor connected across said capacitor and coupled to said Schmitt trigger for discharging said capacitor in response to monitored voltage of less than a predetermined voltage;
    a transistor connected to supply an adjustable constant current to charge said capacitor;
    whereby said output transistor is turned off after a predetermined time delay from the instant the monitored voltage rises above said predetermined voltage and is turned off without delay from the instant the monitored voltage falls below said predetermined voltage.

* * * * *